United States Patent
McGuire et al.

(10) Patent No.: US 9,163,923 B2
(45) Date of Patent: Oct. 20, 2015

(54) ALIGNMENT SYSTEMS FOR STRUT ASSEMBLIES

(71) Applicant: Toyota Motor Engineering & Manufacturing North America, Inc., Erlanger, KY (US)

(72) Inventors: Andrew Ivor McGuire, Lexington, KY (US); John Wayne Rhule, Versailles, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 179 days.

(21) Appl. No.: 14/082,834

(22) Filed: Nov. 18, 2013

(65) Prior Publication Data

US 2015/0135546 A1  May 21, 2015

(51) Int. Cl.
- *G01B 5/25* (2006.01)
- *G01B 5/14* (2006.01)
- *G01B 3/28* (2006.01)

(52) U.S. Cl.
CPC .. *G01B 5/25* (2013.01); *G01B 3/28* (2013.01); *G01B 5/14* (2013.01)

(58) Field of Classification Search
CPC .............. G01B 5/25; G01B 5/14; G01B 3/28
USPC .......................................... 33/645, 1 BB, 600
See application file for complete search history.

(56) References Cited

U.S. PATENT DOCUMENTS

| | | | |
|---|---|---|---|
| 4,581,802 A * | 4/1986 | Castoe ........................ | 29/402.19 |
| 4,696,190 A | 9/1987 | Bucher et al. | |
| 4,703,547 A | 11/1987 | Togawa | |
| 4,930,226 A * | 6/1990 | Shindelar ........................ | 33/655 |
| 5,097,604 A * | 3/1992 | Brown ............................. | 33/613 |
| 5,185,124 A | 2/1993 | Johansson et al. | |
| 5,471,754 A * | 12/1995 | Mieling ..................... | 33/203.18 |
| 6,073,357 A * | 6/2000 | Kosmalski ...................... | 33/628 |
| 6,470,554 B1 | 10/2002 | Aubarede et al. | |
| 6,510,620 B2 * | 1/2003 | Bender ........................... | 33/636 |
| 6,612,042 B1 | 9/2003 | McKinney et al. | |
| 6,883,245 B1 * | 4/2005 | Jirele ............................... | 33/613 |
| 7,356,939 B1 * | 4/2008 | McCrary et al. ................ | 33/600 |
| 7,484,312 B2 * | 2/2009 | Morgan .......................... | 33/645 |
| 8,286,362 B2 * | 10/2012 | Petersheim ..................... | 33/613 |
| 8,584,372 B2 * | 11/2013 | Stoffel ............................ | 33/628 |
| 8,800,156 B2 * | 8/2014 | Sullivan et al. ................. | 33/608 |
| 2015/0135546 A1 * | 5/2015 | McGuire et al. ................ | 33/645 |

* cited by examiner

*Primary Examiner* — Christopher Fulton
(74) *Attorney, Agent, or Firm* — Dinsmore & Shohl LLP

(57) ABSTRACT

A method of determining alignment of a spring component relative to an upper spring mounting plate of a strut assembly using an alignment system is provided. The method includes placing an alignment gauge component on the upper spring mounting plate at a preselected location. The alignment gauge component has a right angled body with a positioning portion resting on the upper spring mounting plate and a transverse measuring portion having an opening extending therethrough located alongside the spring component. A measuring rod is inserted through the opening of the measuring portion with the positioning portion of the alignment gauge component engaged with the upper spring mounting plate. The measuring rod has a measurement region that includes one or more color-coded areas for determining an alignment condition of the spring component relative to the upper spring mounting plate with the measuring rod extending through the opening and contacting the spring component.

20 Claims, 12 Drawing Sheets

160

| LOC | ANGLE | OK | NG |
|---|---|---|---|
| A | 0° | G | Y<br>R |
| B | 90° | G | Y<br>R |
| C | 180° | G<br>Y | R |

FIG. 10

ALIGNMENT SYSTEMS FOR STRUT ASSEMBLIES

TECHNICAL FIELD

The present specification generally relates to alignment systems and, more particularly, to an alignment system for spring position relative to an upper support of strut assemblies.

BACKGROUND

Strut assemblies for vehicles include a number of components such as a shock absorber that includes a piston rod and an outer cylinder. An upper end of the piston rod is connected to a vehicle body via an upper support. A lower end of the outer cylinder is fixed to a hub carrier. Typically, a coil spring is provided around the shock absorber and is connected to the upper support. An insulator may be provided about the shock absorber to suppress noise.

It can be desirable to align the various components of the strut assemblies to improve operation and reduce noise. Typically, this alignment is done by visual inspection. Other alignment processes for the strut assemblies are desired.

SUMMARY

In one embodiment, an alignment system for determining alignment of a spring component relative to an upper spring mounting plate of a strut assembly includes an alignment gauge component having a right angled body with a positioning portion configured to rest on the upper spring mounting plate and a transverse measuring portion having an opening extending therethrough arranged to be located alongside the spring component. A measuring rod is sized to be received through the opening of the measuring portion with the positioning portion of the alignment gauge component engaged with the upper spring mounting plate at a predetermined location. The measuring rod has a measurement region that includes one or more color-coded areas that are used to determine an alignment condition of the spring component relative to the upper spring mounting plate with the measuring rod extending through the opening and in contact with the spring component.

In another embodiment, a method of determining alignment of a spring component relative to an upper spring mounting plate of a strut assembly using an alignment system is provided. The method includes placing an alignment gauge component on the upper spring mounting plate at a preselected location. The alignment gauge component has a right angled body with a positioning portion resting on the upper spring mounting plate and a transverse measuring portion having an opening extending therethrough located alongside the spring component. A measuring rod is inserted through the opening of the measuring portion with the positioning portion of the alignment gauge component engaged with the upper spring mounting plate. The measuring rod has a measurement region that includes one or more color-coded areas for determining an alignment condition of the spring component relative to the upper spring mounting plate with the measuring rod extending through the opening and contacting the spring component.

In another embodiment, a method of determining alignment of a spring component relative to an upper spring mounting plate of a strut assembly using an alignment system is provided. The method includes placing an alignment gauge component on the upper spring mounting plate at a preselected location using a position template. The alignment gauge component has a body with a positioning portion resting on the upper spring mounting plate and a measuring portion having an opening extending therethrough located alongside the spring component. A measuring rod is inserted through the opening of the measuring portion with the positioning portion of the alignment gauge component engaged with the upper spring mounting plate. The measuring rod has a measurement region for determining an alignment condition of the spring component relative to the upper spring mounting plate with the measuring rod extending through the opening and contacting the spring component.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 10 illustrates an exemplary criteria summary chart according to one or more embodiments described herein.

DETAILED DESCRIPTION

Embodiments described herein generally relate to alignment systems for aligning spring position relative to an upper support of strut assemblies. The alignment systems generally include an alignment gauge component and a measuring component that mates with the alignment gauge component to determine alignment of a spring component with an upper support of a strut assembly. A position template may be used to position the alignment gauge relative to the strut assembly for improved repeatability and standardization prior to installation of the strut assemblies in the vehicles.

Figure 1:
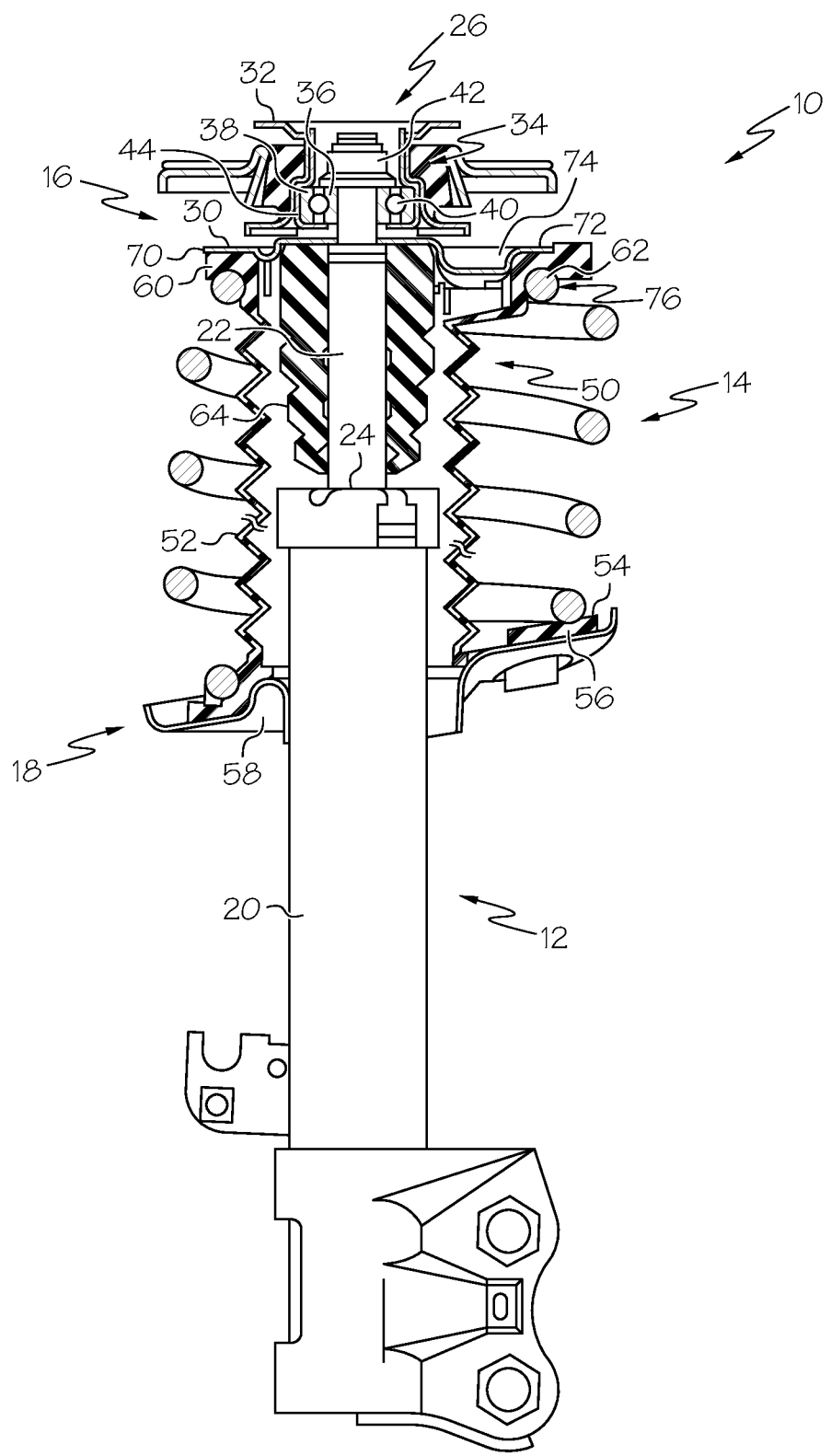
FIG. 1 is a side, partial section view of a strut assembly according to one or more embodiments described herein.

Referring to FIG. 1, a strut assembly 10 includes a shock absorber 12, a spring component 14, an upper support assembly 16 and a lower support assembly 18. The shock absorber includes an outer cylinder 20 and a piston rod 22 that slidably protrudes outwardly from an end 24 of the outer cylinder 20. The piston rod 22 is connected to the upper support assembly 16, which connects the strut assembly 10 to a vehicle body. The spring component 14 (e.g., a coil spring) is provided about the shock absorber 12. The spring component 14 is held between the upper support assembly 16 and the lower support assembly 18 in compression.

The upper support assembly 16 includes a mounting portion 26 and an upper spring mounting plate 30. The mounting portion 26 includes a mounting plate 32 that mounts to the vehicle body and a bearing 34 having an inner race 36, an outer race 38 and ball bearings 40 located therebetween. The piston rod 22 is mounted to the mounting portion 26 using a fastener 42 that fastens the piston rod 22 to the inner race 36 of the bearing 34. The outer race 38 of the bearing 34 is fixed to the mounting portion 26 within a recessed bearing seat 44 thereby allowing rotation of the strut assembly 10.

An insulator component 50 includes a bellows portion 52 disposed about the piston rod 22 and extending along a length of the piston rod 22 and outer cylinder 20. The insulator component 50 includes a lower insulator portion 54 that extends radially outwardly from the bellows portion 52 and is captured (i.e., sandwiched) between a lower end 56 of the spring component 14 and a lower spring mounting plate 58 of the lower support assembly 18. Similarly, the insulator component 50 includes an upper insulator portion 60 that extends radially outwardly from the bellows portion 52 and is captured (i.e., sandwiched) between an upper end 62 of the spring component 14 and the upper spring mounting plate 30. A bumper component 64 is located within the bellows portion 52 of the insulator component 50 and is also disposed about the piston rod 22, extending along a length of the piston rod 22 toward the outer cylinder 20. The bumper component 64 is used to limit retraction of the piston rod 22 into the outer cylinder 20 during use.

As can be seen by FIG. 1, the upper spring mounting plate 30 has a periphery 70 and a substantially planar portion 72 that extends radially from a recess portion 74 to the periphery 70. An upper coil 76 of the spring component 14 is located beneath the planar portion 72 with the upper insulator portion 60 located therebetween.

Figure 2:
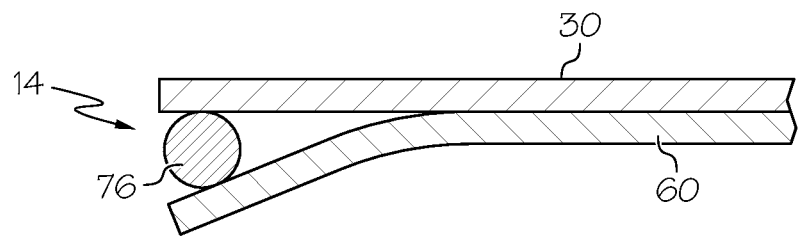
FIG. 2 is a diagrammatic illustration of an insulator of the strut assembly of FIG. 1 in a tucked condition.

Improper alignment of the strut assembly components can be undesirable. For example, misalignment of the spring component 14 relative to the upper spring mounting plate 30 can result in a "tucking" condition on the upper insulator portion 60 (FIG. 2) after a dynamic drive pattern that can expose the upper spring mounting plate 30 to the spring component 14. When the upper insulator portion 60 tucks, the spring component 14 can hard touch the upper spring mounting plate 30, producing a loud noise that can be heard by the driver. When such an out-of-alignment condition is identified during vehicle assembly, the vehicle may be taken off line and repaired. Naturally, this can result in a delay in vehicle production and can be a time intensive and costly endeavor.

Figure 3:
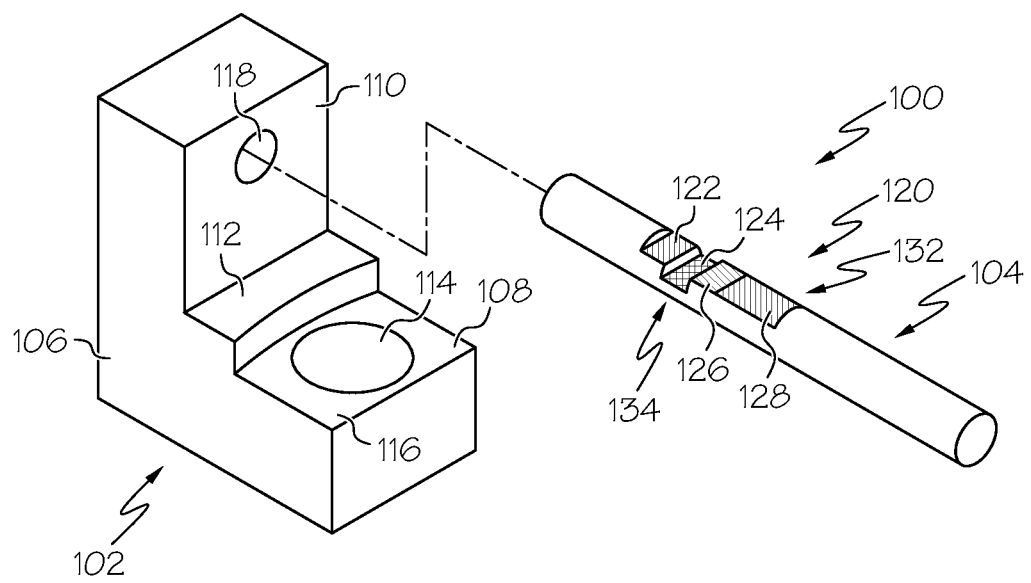
FIG. 3 is a perspective view of an alignment system used to determine whether an out-of-alignment condition exists according to one or more embodiments described herein.

Referring to FIG. 3, an alignment system 100 may be used to determine whether an out-of-alignment condition exists between the spring component 14 and the upper spring mounting plate 30. The alignment system 100 includes an alignment gauge component 102 and a measuring component in the form of a measuring rod 104. The alignment gauge component 102 includes a generally L-shaped or right angled body 106 having a positioning portion 108 and a transverse measuring portion 110. A stepped portion 112 is located between the positioning portion 108 and the measuring portion 110. A fastener may be provided at the positioning portion 108. In the illustrated example, the fastener is a magnet 114 that is recessed into the positioning portion 108 to provide a flush resting surface 116, which can be positioned on the upper spring mounting plate 30, as will be described in greater detail below. The measuring portion 110 includes a through opening 118 that is sized to slidingly receive the measuring rod 104. The alignment gauge component 102 and measuring rod 104 can be formed using any suitable materials, such as plastics or metals and by any suitable process, such as machining, molding, etc.

The measuring rod 104 includes a measurement region 120 that is used to make an alignment determination. The measurement region 120 may include a color-coded pattern of areas 122, 124, 126 and 128 having different colors. As an example, areas 122 and 128 may be red, area 124 may be yellow and area 126 may be green. Each area 122, 124, 126 and 128 begins and ends a preselected distance from an insertion end 130 of the measuring rod 104. These preselect distances correspond to acceptable and unacceptable alignment conditions of the spring component 14 relative to the upper spring mounting plate 30. In some embodiments, the areas 122, 124, 126 and 128 may be recessed or formed within one or more cut-out regions 132 and 134 of the measuring rod 104, which can facilitate painting and locating the beginning and ends of each of the areas 122, 124, 126 and 128. In addition, while four areas 122, 124, 126 and 128 are illustrated, any suitable number of areas may be used including more or less than four areas.

Figure 4:
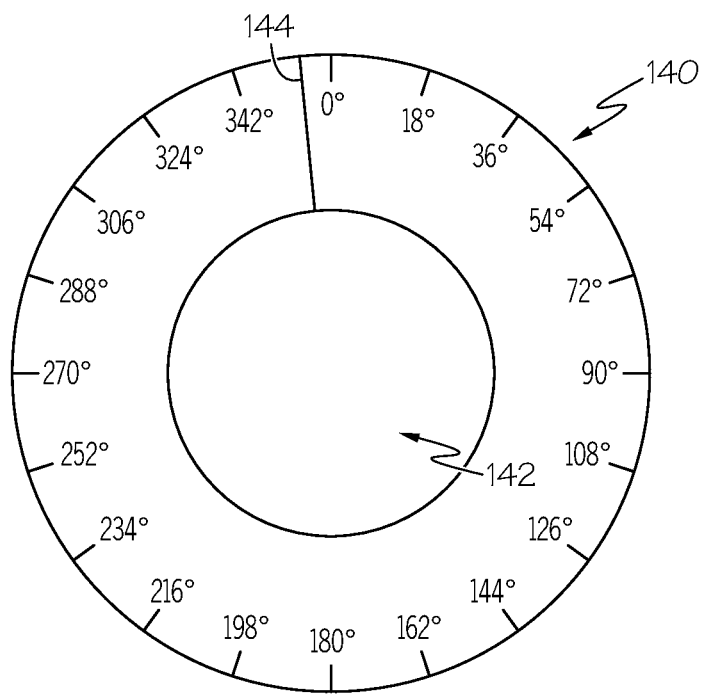
FIG. 4 is a top view of a positioning template according to one or more embodiments described herein.

Referring to FIG. 4, a position template 140 may be used in positioning the alignment gauge component 102 in a repeatable fashion on the upper spring mounting plate 30 at predetermined positions about the upper spring mounting plate 30. The position template 140 may have a shape corresponding to that of the upper spring mounting plate 30 and may be generally circular in shape having an outer diameter that is slightly smaller than an outer diameter of the upper spring mounting plate 30. The position template 140 also has an opening 142 that is sized to receive the mounting portion 26 of the upper support assembly 16 to allow the position template 140 to rest on the upper spring mounting plate 30 in a flat, laid out state. In some embodiments, a slit 144 may be provided that facilitates opening of the position template 140 and placement of the position template 140 on the upper spring mounting plate 30. Any suitable materials may be used to form the position template 140, such as various films, plastics, paper, etc. Adhesives or any other suitable material may be used to releasably secure the position template 140 in the desired position on the upper spring mounting plate 30. In other embodiments, a position template may be printed directly on the upper spring mounting plate 30.

Figure 5:
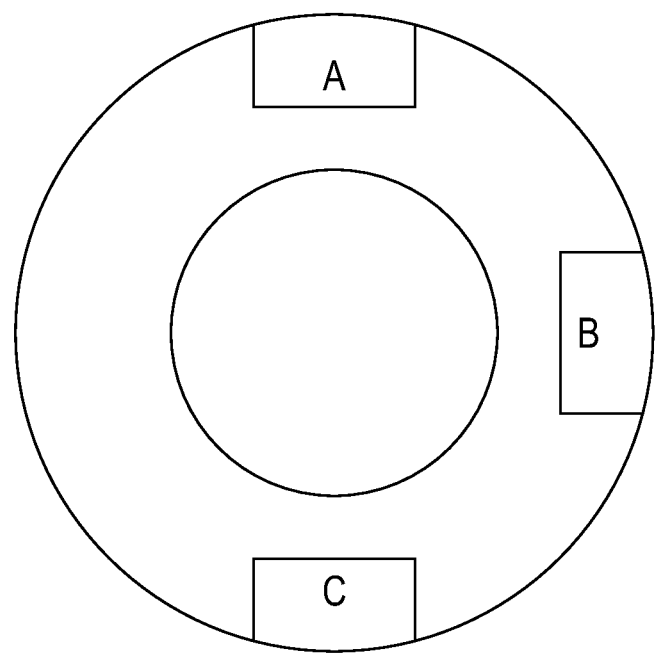
FIG. 5 is a top view of another positioning template according to one or more embodiments described herein.

In FIG. 4, the position template 140 is illustrated graduated by degrees. In this example, the position template 140 is divided into 18 degree increments about the entire periphery of the position template 140. Other graduations are possible, such as every one, two, five, 10, 15, 45, 90 degrees. Other indicia are possible, such as shown by FIG. 5 where areas A, B and C are marked. These areas indicate where the alignment gauge component 102 is to be placed to determine alignment.

Figure 6:
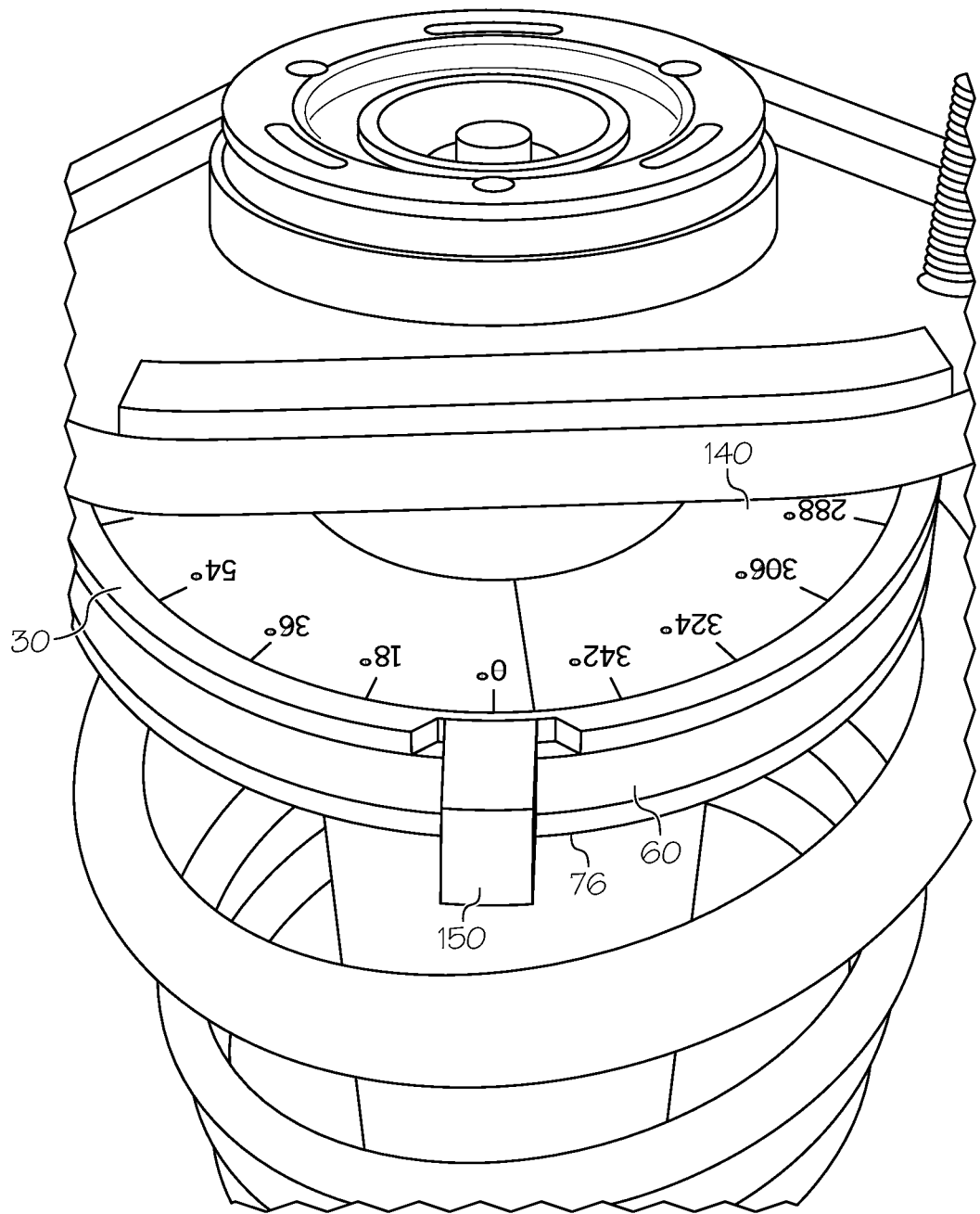
FIGS. 6-9 illustrate an exemplary method of making an alignment determination according to one or more embodiments described herein.
Figure 7:
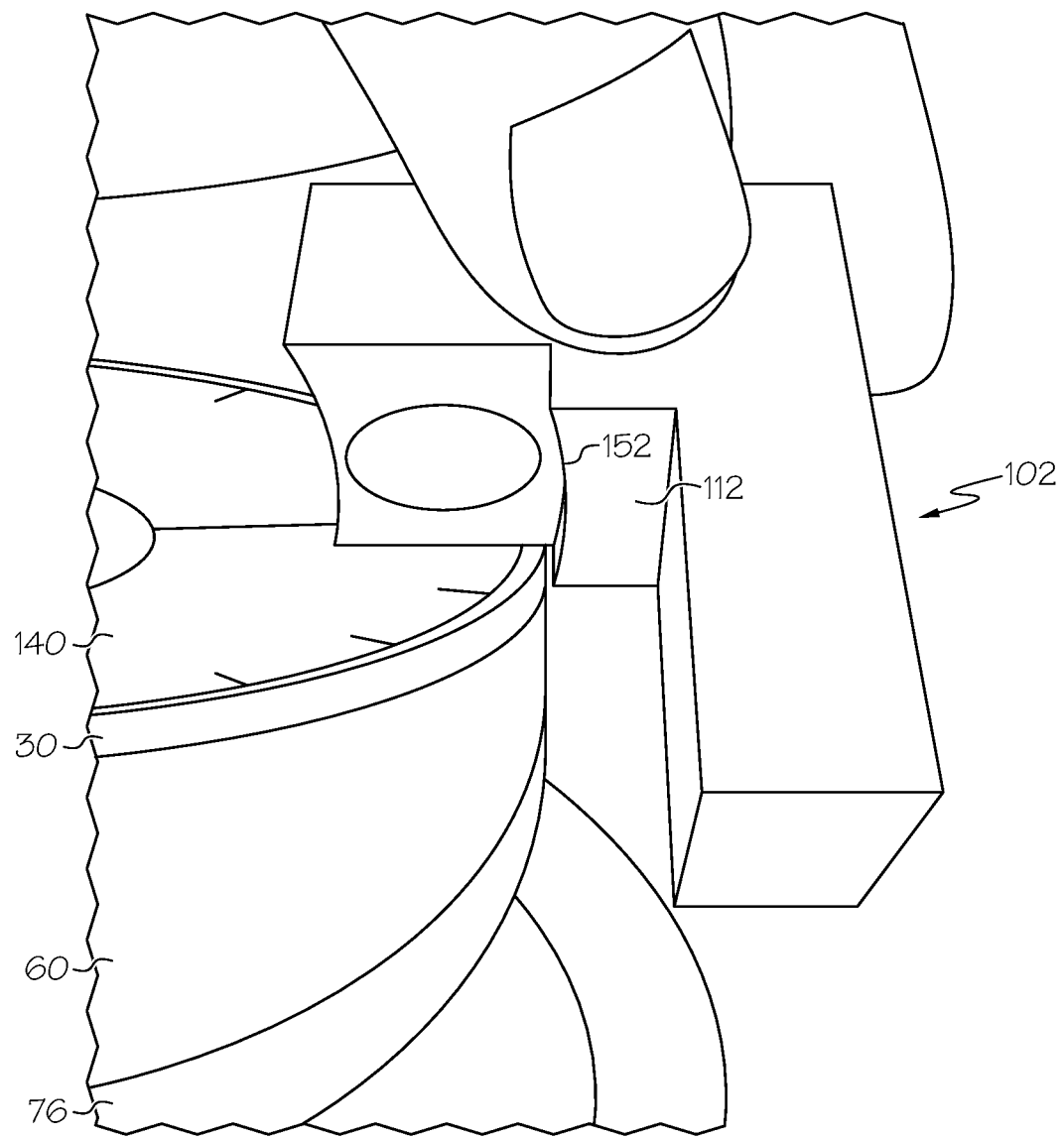
Figure 8:
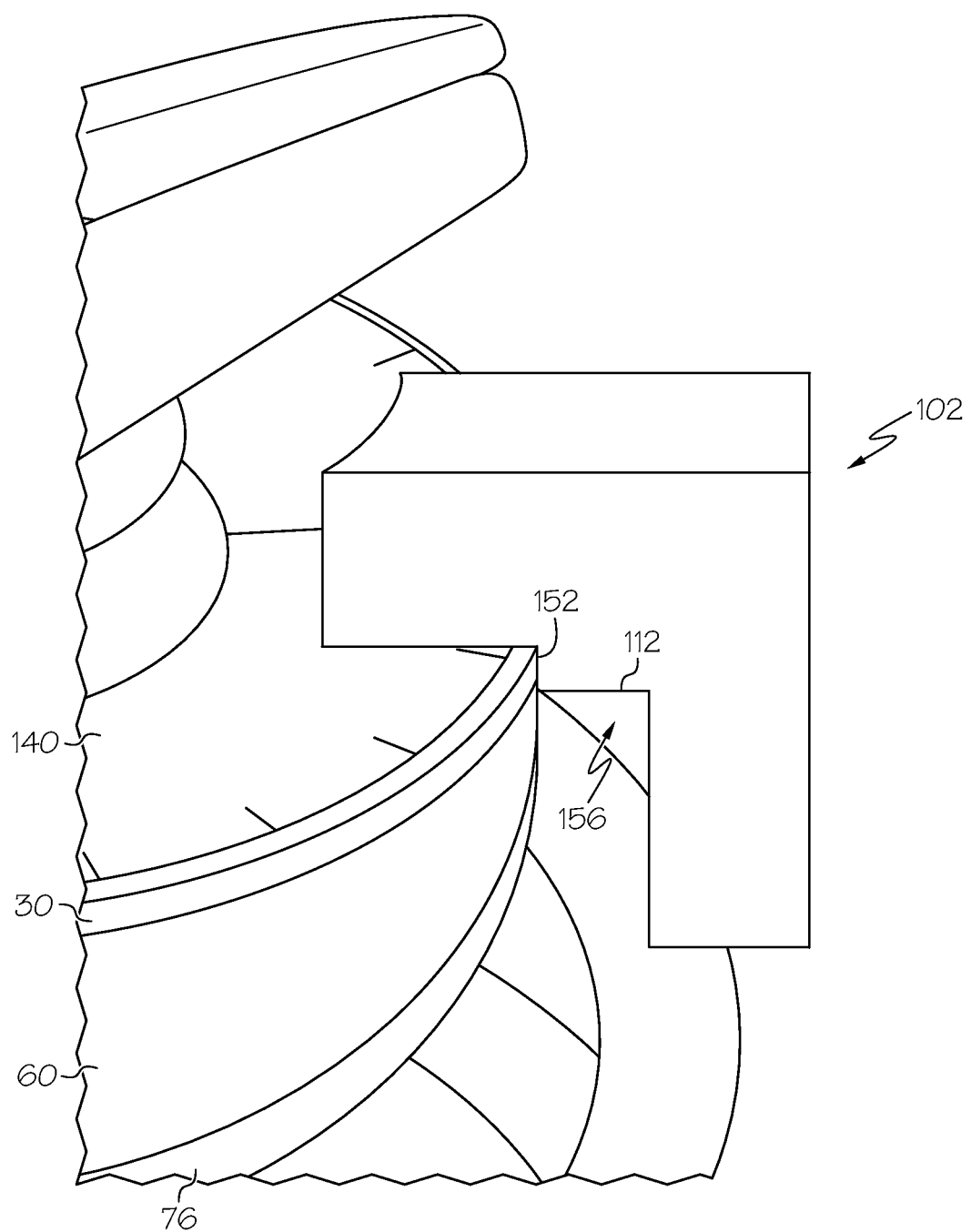
Figure 9:
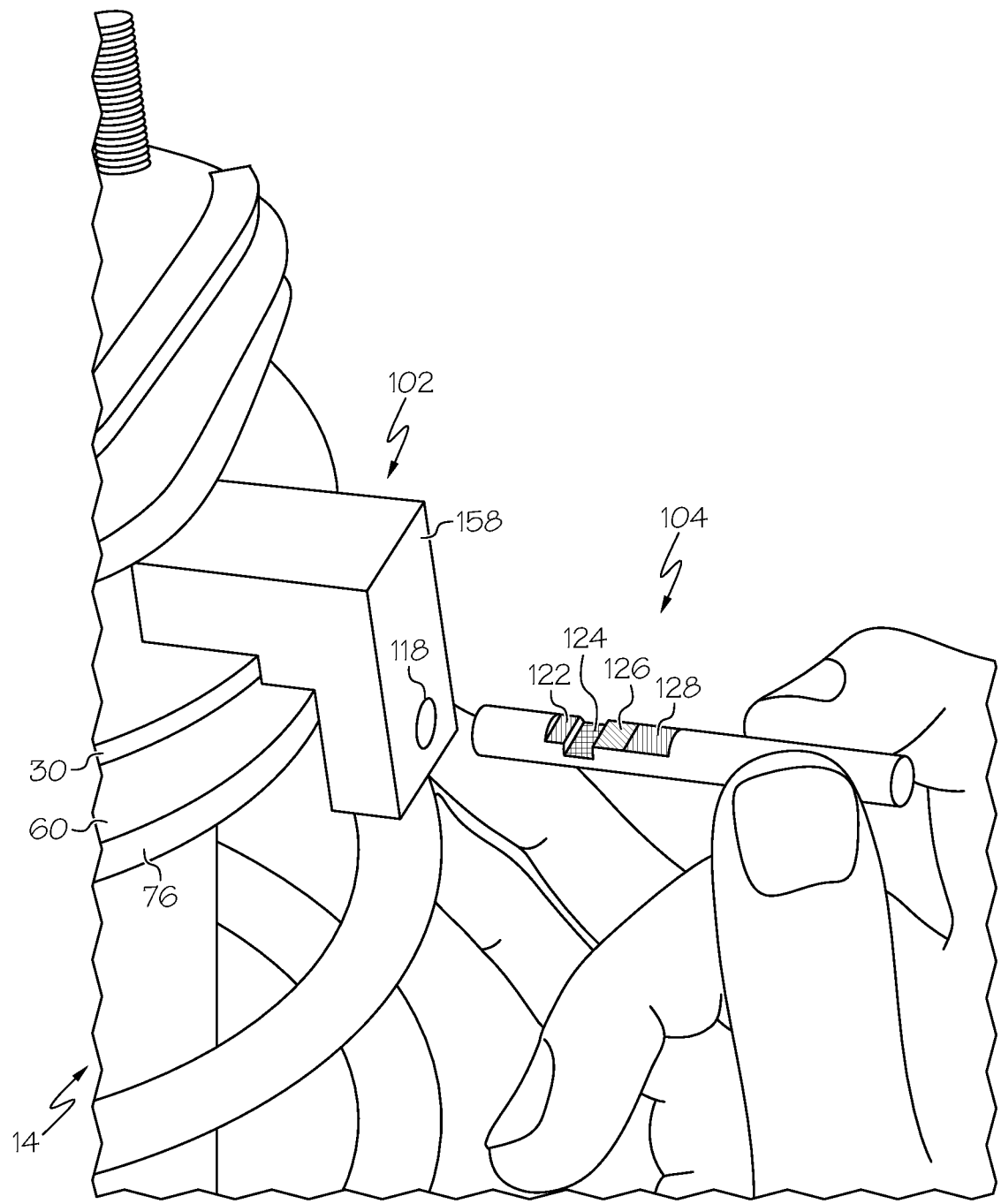

Referring to FIGS. 6-9, an exemplary method of making an alignment determination is illustrated. Referring first to FIG. 6, the position template 140 may be placed on the upper spring mounting plate 30. In the illustrated embodiment, a tab 150 of the upper insulator portion 60 is used in positioning the zero degree mark of the position template 140 just to the left of the tab 150 as shown. Providing a mark or the tab 150 for aligning the position template 140 can aid in repeatability between strut assemblies. Referring to FIG. 7, once the position template 140 is placed on the upper spring mounting plate 30, the alignment gauge component 102 may be positioned on the upper spring mounting plate 30 using the position template 140. As one example, it may be desirable to measure spring alignment at three locations A, B and C. Location A may correspond to zero degrees on the position template 140, location B may correspond to 90 degrees on the position template 140 and location C may correspond to 180 degrees on the position template 140. The stepped portion 112 of the alignment gauge component 102 has an alignment ledge 152 (see also FIG. 1) that is used as a datum to align the alignment gauge component 102 radially on the upper spring mounting plate 30. The alignment ledge 152 may have a radius of curvature that matches the radius of curvature of the periphery of the upper spring mounting plate 30 to provide a close fit between the alignment gauge component 102 and the upper spring mounting plate 30. As can be seen by FIG. 8, with the alignment ledge 152 and the periphery of the upper spring mounting plate 30 engaged, a radially extending gap 156 is provided between the upper spring mounting plate 30 and the measuring portion 110 of the alignment gauge component 102 with the measuring portion 110 extending axially alongside the spring component 14. Such a gap can accommodate measurement of the spring component 14, even if it protrudes outwardly beyond the upper spring mounting plate 30. The magnet 114 can releasably secure the alignment gauge component 102 to the upper spring mounting plate 30 due to the magnetic attraction of the magnet 114 to the upper spring mounting plate 30. Referring to FIG. 9, the measuring rod 104 may be inserted through the opening 118 to the point the spring component 14 is contacted to determine whether alignment criteria has been met between the spring component 14 and the upper spring mounting plate 30 using the color-coded pattern of areas 122, 124, 126 and 128. The color seen at the opening 118 (at wall 158) is the color used for the measurement.

Referring to FIG. 10, an exemplary criteria summary chart 160 is illustrated for the strut assembly 10. As can be seen in this example, at locations A and B, only a green reading using the measuring rod 104 is acceptable. Yellow or red readings indicate a "no go" situation and there may be a need to re-align the strut assembly. At position C, both green and yellow readings are acceptable with only a red reading being a no go situation. These go and no go possibilities are merely exemplary and can change with different strut assemblies having different configurations.

Figure 11A:
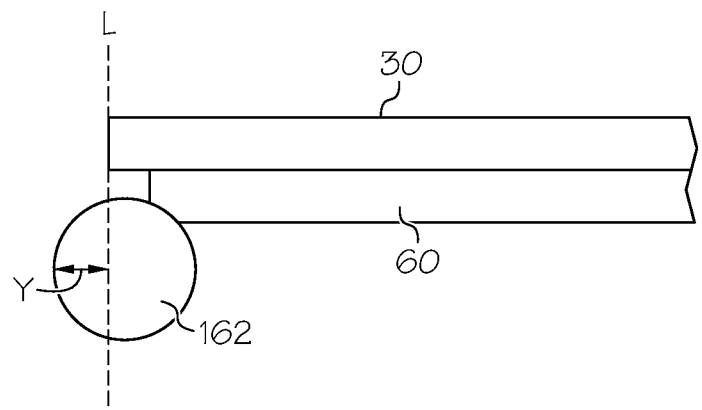
FIGS. 11A-14B illustrate various alignment conditions for a spring component relative to an upper spring mounting plate and upper insulator portion according to one or more embodiments described herein.
Figure 11B:
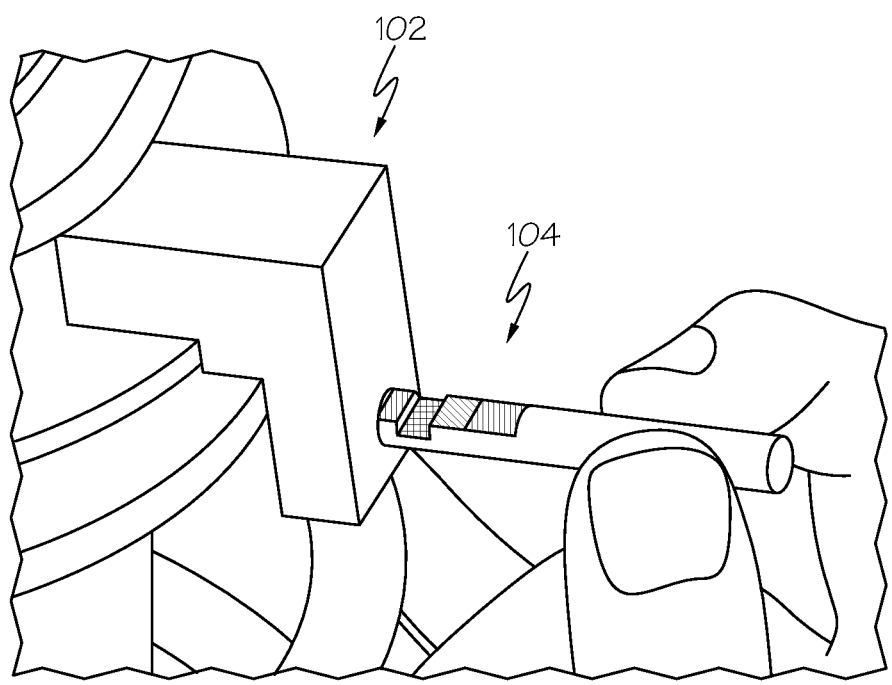
Figure 12A:
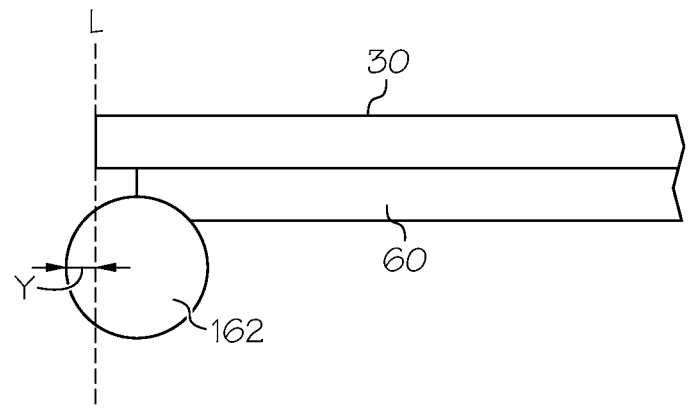
Figure 12B:
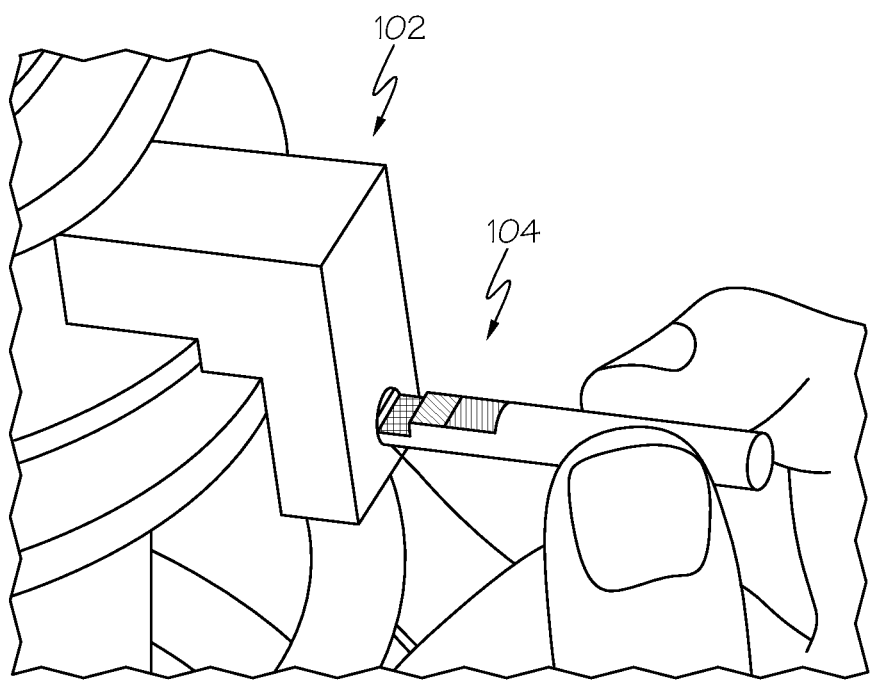

FIGS. 11A-14B illustrate various alignment conditions for the spring component 14 relative to the upper spring mounting plate 30 and upper insulator portion 60. FIGS. 11A and 11B illustrate a protruded condition where coil 162 of the spring component 14 adjacent the upper insulator portion 60 is protruded beyond more than 3 mm beyond the upper spring mounting plate 30 (as represented by the dotted line L). In this protruded condition, an alignment measurement using the alignment system 100 would result in a red reading at locations A, B and C resulting in a no go situation and a need for re-alignment prior to installation in a vehicle. FIGS. 12A and 12B illustrate another protruded condition where coil 162 of the spring component 14 adjacent the upper insulator portion 60 is protruded less than 3 mm beyond (between 0 mm and 3 mm) the upper spring mounting plate 30 (as represented by the dotted line L). In this protruded condition, an alignment measurement using the alignment system 100 would result in a yellow reading at locations A, B and C resulting in a no go situation and a need for re-alignment.

Figure 13A:
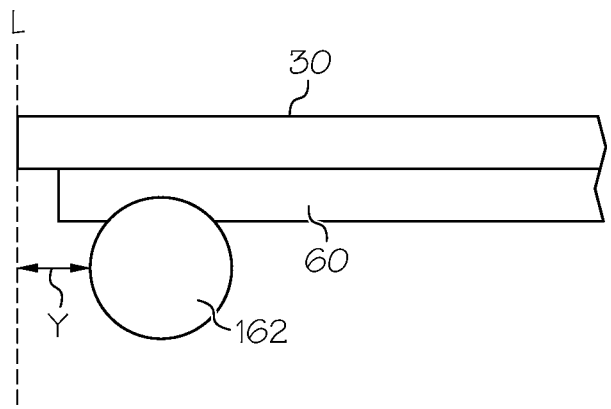
Figure 13B:
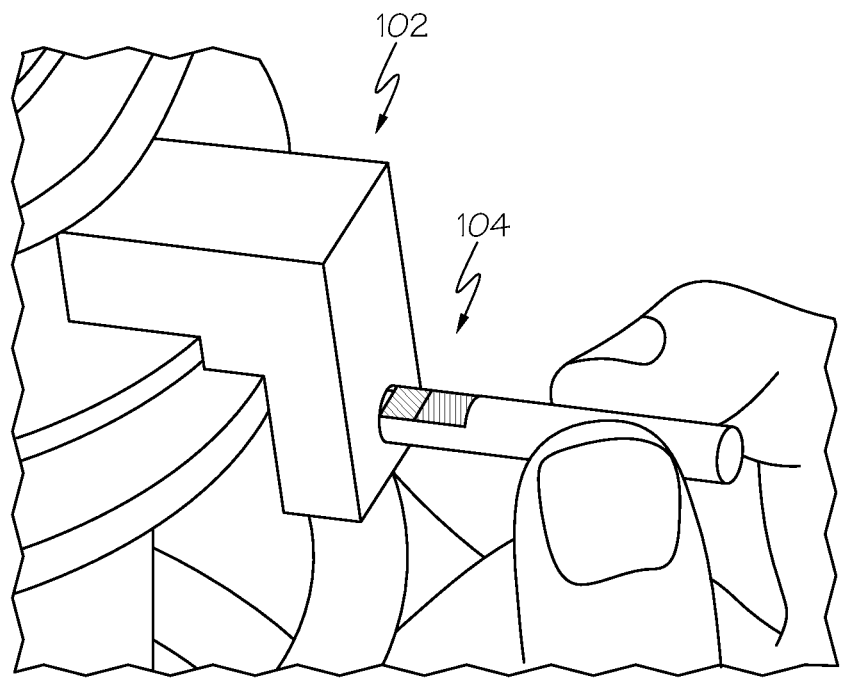
Figure 14A:
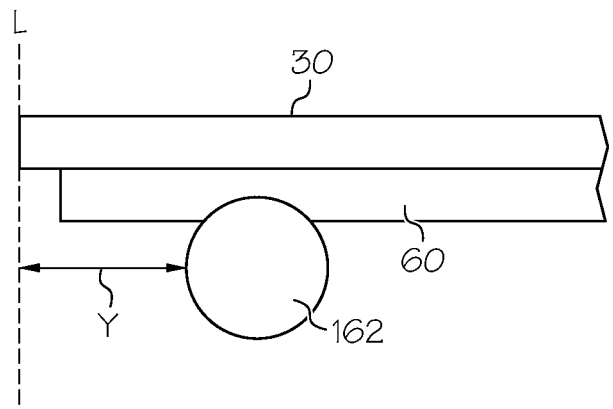
Figure 14B:
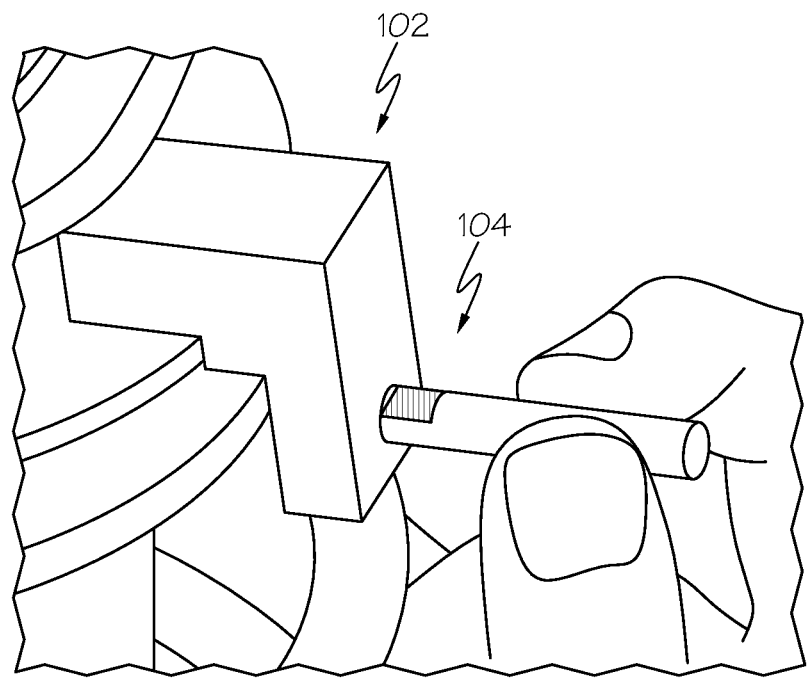

FIGS. 13A and 13B illustrate an aligned condition where coil 162 of the spring component 14 adjacent the upper insulator portion 60 is retracted inside the upper spring mounting plate 30 less than 4 mm inside (between 0 mm and 4 mm) the upper spring mounting plate 30 (as represented by the dotted line L). In this aligned condition, an alignment measurement using the alignment system 100 would result in a green reading at locations A, B and C resulting in a go situation and no need for re-alignment. By contrast, FIGS. 14A and 14B illustrate a retracted condition where coil 162 of the spring component 14 adjacent the upper insulator portion 60 is retracted more than 4 mm inside (greater than 4 mm) the upper spring mounting plate 30 (as represented by the dotted line L). In this retracted condition, an alignment measurement using the alignment system 100 would result in a red reading at locations A, B and C resulting in a no go situation and a need for re-alignment.

The above-described alignment systems allow a user to more readily identify an out-of-alignment condition using a go/no go type of gauge rather than relying on sight alone. The alignment systems utilize an alignment gauge component and a measuring rod to determine alignment between the upper spring mounting plate and a spring component of a strut assembly. A position template may also be provided, which can facilitate repeatability of alignment determinations among numerous strut assemblies.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An alignment system for determining alignment of a spring component relative to an upper spring mounting plate of a strut assembly, the alignment system comprising:
   an alignment gauge component having a right angled body with a positioning portion configured to rest on the upper spring mounting plate and a transverse measuring portion having an opening extending therethrough arranged to be located alongside the spring component; and
   a measuring rod sized to be received through the opening of the measuring portion with the positioning portion of the alignment gauge component engaged with the upper spring mounting plate at a predetermined location, the measuring rod having a measurement region that includes one or more color-coded areas that are used to determine an alignment condition of the spring component relative to the upper spring mounting plate with the measuring rod extending through the opening and in contact with the spring component.

2. The alignment system of claim 1 further comprising a position template sized and configured to be placed on the upper spring mounting plate, the position template having indicia for placement of the alignment gauge on the upper spring mounting plate.

3. The alignment system of claim 2, wherein the indicia comprises gradations of degrees.

4. The alignment system of claim 1, wherein the measurement region has multiple areas having different colors.

5. The alignment system of claim 1, wherein the body includes a stepped portion between the positioning portion and the measuring portion, the stepped portion forming an alignment ledge forming a datum to align the alignment gauge component radially on the upper spring mounting plate.

6. The alignment system of claim 1, wherein the alignment gauge component further comprises a magnet located at the positioning portion.

7. The alignment system of claim 6, wherein the magnet is recessed into the positioning portion.

8. A method of determining alignment of a spring component relative to an upper spring mounting plate of a strut assembly using an alignment system, the method comprising:
placing an alignment gauge component on the upper spring mounting plate at a preselected location, the alignment gauge component having a right angled body with a positioning portion resting on the upper spring mounting plate and a transverse measuring portion having an opening extending therethrough located alongside the spring component; and
inserting a measuring rod through the opening of the measuring portion with the positioning portion of the alignment gauge component engaged with the upper spring mounting plate, the measuring rod having a measurement region that includes one or more color-coded areas for determining an alignment condition of the spring component relative to the upper spring mounting plate with the measuring rod extending through the opening and contacting the spring component.

9. The method of claim 8 further comprising placing a position template on the upper spring mounting plate before the step of placing the alignment gauge component on the upper spring mounting plate, the position template having indicia for placing the alignment gauge component on the upper spring mounting plate.

10. The method of claim 9, wherein the indicia comprises gradations of degrees.

11. The method of claim 8, wherein the step of placing the alignment gauge component on the upper spring mounting plate at the preselected location is at a first preselected location, the method further comprising placing the alignment gauge component at a second preselected location different from the first preselected location and inserting the measuring rod through the opening of the measuring portion with the positioning portion of the alignment gauge component engaged with the upper spring mounting plate at the second preselected location.

12. The method of claim 8 comprising attaching the alignment gauge component on the upper spring mounting plate using a magnet.

13. The method of claim 12, wherein the magnet is recessed into the positioning portion.

14. The method of claim 8, wherein the body includes a stepped portion between the positioning portion and the measuring portion, the stepped portion forming an alignment ledge forming a datum aligning the alignment gauge component radially on the upper spring mounting plate.

15. The method of claim 8, wherein the measurement region has multiple areas having different colors.

16. A method of determining alignment of a spring component relative to an upper spring mounting plate of a strut assembly using an alignment system, the method comprising:
placing an alignment gauge component on the upper spring mounting plate at a preselected location using a position template, the alignment gauge component having a body with a positioning portion resting on the upper spring mounting plate and a measuring portion having an opening extending therethrough located alongside the spring component; and
inserting a measuring rod through the opening of the measuring portion with the positioning portion of the alignment gauge component engaged with the upper spring mounting plate, the measuring rod having a measurement region for determining an alignment condition of the spring component relative to the upper spring mounting plate with the measuring rod extending through the opening and contacting the spring component.

17. The method of claim 16, wherein the position template has indicia for placing the alignment gauge component on the upper spring mounting plate.

18. The method of claim 17, wherein the indicia comprises gradations of degrees.

19. The method of claim 16, wherein the step of placing the alignment gauge component on the upper spring mounting plate at the preselected location is at a first preselected location, the method further comprising placing the alignment gauge component at a second preselected location using the position template different from the first preselected location and inserting the measuring rod through the opening of the measuring portion with the positioning portion of the alignment gauge component engaged with the upper spring mounting plate at the second preselected location.

20. The method of claim 16 comprising attaching the alignment gauge component on the upper spring mounting plate using a magnet.

* * * * *